United States Patent [19]

Osuna-Diaz

[11] 4,266,723
[45] May 12, 1981

[54] NOZZLE FOR INJECTION MOLDING MACHINES

[75] Inventor: Jesus M. Osuna-Diaz, Rochester, Mich.

[73] Assignee: Incoe Corporation, Troy, Mich.

[21] Appl. No.: 90,522

[22] Filed: Nov. 2, 1979

[51] Int. Cl.³ .......................................... B05B 13/00
[52] U.S. Cl. ................................. 239/132; 239/590; 425/549
[58] Field of Search ............ 239/132, 590, 600, 533.1; 222/547, 564; 425/549, 568

[56] References Cited

U.S. PATENT DOCUMENTS

| | | | |
|---|---|---|---|
| 2,809,073 | 10/1957 | Wahlert | 239/590 |
| 2,871,517 | 2/1959 | Allard | 425/549 |
| 3,077,636 | 2/1963 | Peters | 425/568 X |
| 4,010,903 | 3/1977 | Sakori et al. | 425/549 X |

Primary Examiner—Robert B. Reeves
Assistant Examiner—Gene A. Church
Attorney, Agent, or Firm—Harness, Dickey & Pierce

[57] ABSTRACT

A self-contained molding machine nozzle which is mountable in the mold die and has optimum material flow and heat control characteristics while reducing repair costs. The nozzle comprises an elongated body having a central passage, and a replaceable exit cap mounted at the forward end of the body, this exit cap carrying a torpedo which guides the material to the exit orifice. An external heater surrounds the body and extends over the cap which is provided with flats to facilitate removal and limit heat transfer. An air gap is provided between the cap and surrounding mold die to prevent undesired chilling of the tip by the cooled die.

16 Claims, 3 Drawing Figures

NOZZLE FOR INJECTION MOLDING MACHINES

BACKGROUND OF THE INVENTION

1. Field of the Invention

The invention relates to molding machine nozzles, and more particularly to nozzles having a straight central flow passage leading to a "torpedo" flow guide at the exit orifice, and further having heating means for the nozzle. This type of molding machine nozzle is considered quite desirable and is less expensive than a shut-off type of bushing or nozzle.

2. Description of the Prior Art

A known prior art molding machine nozzle of this type has an elongated body with a relatively long torpedo bushing threadably mounted therein. The torpedo bushing extends downwardly from its threaded position and at its tapered forward end has diverging passages which lead the plastic to a conical cavity between the end of the bushing and the surrounding mold die. The nozzle is therefore not self-contained. The die must be machined accurately to form part of the plastic flow passage, which is rather expensive and time-consuming. A heater surrounds the body and in order to have heat flow to the outer end of the torpedo bushing one must rely on heat conduction through the threaded connection after which there is axial heat flow to the end of the bushing. Therefore, it is necessary to make this prior art torpedo bushing out of heat conductive material which is thus relatively soft metal such as bronze. In use a soft material of this nature is subject to abrasive action, especially when handling plastics containing glass particles or other abrasives. The bushing must be replaced frequently and this again is expensive. Another problem with this prior art construction is that the conventional chilling of the mold die will affect the material within the conical exit passage, since one wall of this passage is formed by the mold die itself.

BRIEF SUMMARY OF THE INVENTION

It is an object of the present invention to overcome the deficiencies of the above described prior art molding machine nozzle and to provide a novel and improved nozzle which will be self-contained and have a separate housing tip which is easy to replace and may be fabricated of relatively hard and abrasion-resistant material.

It is another object to provide an improved nozzle construction of this character which permits easy changing of the orifice size for necessary aesthetic purposes to control the size of the vestige left on the molded part.

It is a further object to provide a nozzle construction of this nature which eliminates the need for machining the material of the mold die itself to form part of the material passage.

It is also an object to provide an improved molding machine nozzle of this nature which insures direct heat transfer from the external heater as well as the entering material to the outer end of the nozzle while controlling heat transfer where required adjacent the orifice.

It is another object to provide an improved nozzle of this character which includes means for preventing the chilled mold die from adversely affecting the plastic material at the exit orifice.

Briefly, the injection molding machine nozzle of this invention is mountable in a mold die and comprises an elongated body having a central material passage therethrough, a cap removably mounted at the forward end of said body, the forward end of said cap being tapered forwardly, a heater surrounding said body and the rearward portion of said cap, a torpedo member mounted in said cap, said torpedo member comprising a double tapered central portion and a mounting portion extending radially outwardly therefrom, said tapered portion having a rearward end extending into said central body passage and a forward end extending downwardly into the forward end of said cap, whereby said material passage diverges around said rearward torpedo portion and converges between said forward torpedo portion and said cap, material passageway means in the mounting portion of said torpedo member, a bore in said mold die having a tapered forward end, and means mounting said nozzle in said bore so as to hold said tapered forward cap portion in spaced relation with the tapered portion of said mold die bore.

DESCRIPTION OF THE PREFERRED EMBODIMENTS

Figure 1:
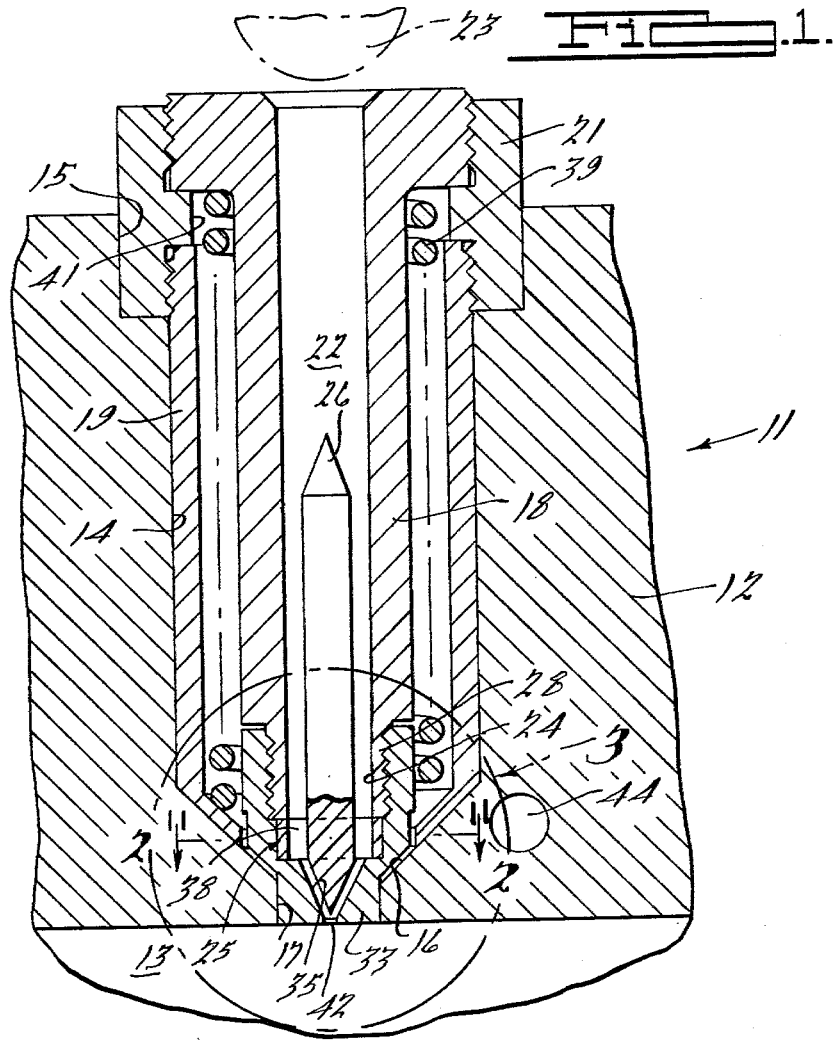
FIG. 1 is a cross-sectional view showing the molding machine nozzle mounted in a mold die.

The molding machine nozzle is generally indicated at 11 and is shown as being mounted in a mold die 12 which partially surrounds a mold cavity 13. The mold die has a bore 14 for the reception of nozzle 11, the rearward end of this bore having a counterbore 15. The forward end of bore 14 leads to a tapered or conical portion 16, the narrow end of which is connected to a relatively narrow cylindrical bore 17 leading to cavity 13.

Nozzle 11 comprises body means that includes an elongated body member 18 and a cylindrical housing member 19 surrounding the body in spaced relation therewith. A support member 21, which also is part of the particular body means here shown by way of illustration, is disposed in counterbore 15 and supports the rearward end of body 18 and housing 19. More particularly, body 18 is threadably mounted in the rearward portion of support 21 while housing 19 is threadably mounted in the forward portion and fits within bore 14.

A central material passage 22 is formed in support 21 and body 18. The rearward end of this passage is so formed as to receive either the nose of cylinder nozzle 23 or the mating surface of a manifold (not shown).

The forward end of passage 22 is indicated at 24, and a torpedo member generally indicated at 25 is mounted forwardly of passage 22 and carries a flared conical rearward portion 26 disposed within passage portion 24. Preferably, portion 26 extends a substantial distance into passage 22, so that it may conduct heat from the material entering passage 22 to the nozzle tip.

Figure 2:
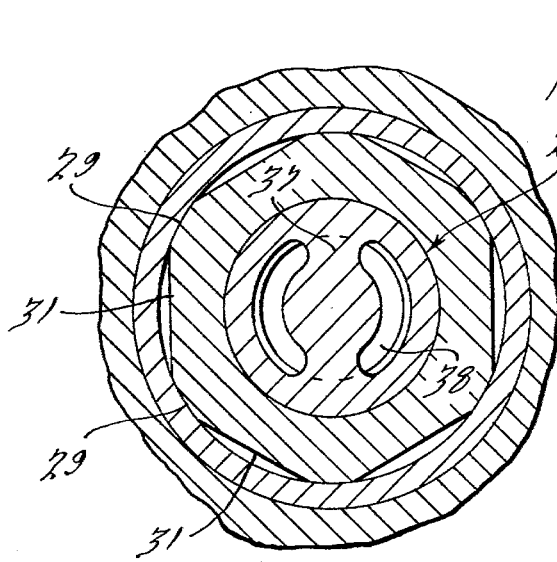
FIG. 2 is a cross-sectional view taken along the line 2—2 of FIG. 1 and showing the flow passages through the mounting portion of the torpedo member, and also showing the relationship between the flats on the cap surface and the housing.
Figure 3:
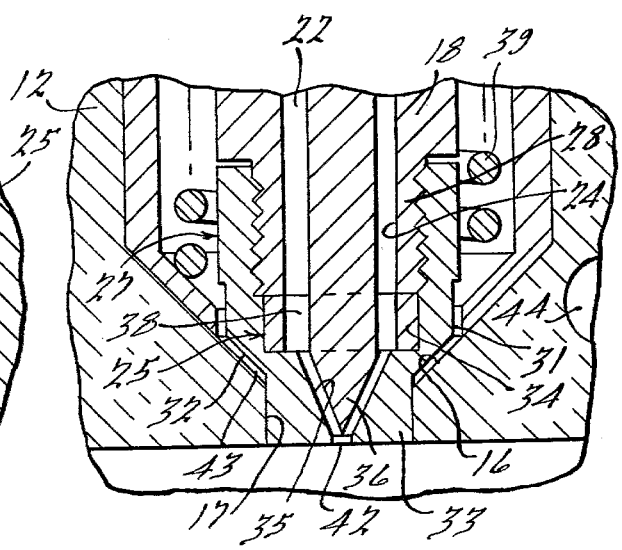
FIG. 3 is an enlarged fragmentary elevational view taken in the area "3" of FIG. 1.

A part of the body means for supporting torpedo member 25 comprises the cap generally indicated at 27. This cap has a threaded mounting portion 28 which is threadably secured to the forward end of body 18. Forwardly of this mounting portion, the exterior surface 29 of body 27 is provided with flats 31. These flats accommodate a wrench for securing or removing the cap but also have another purpose which will appear hereinafter. The forward portion 32 of cap 27 is tapered forwardly and is in inwardly spaced relation with the tapered surface 16 of the die bore. The forward end 33 of cap 27 is cylindrical and fits within the cylindrical bore 17 of the mold die. Torpedo member 25 has a cylindrical mounting portion 34 which fits into cap 27. The cap has a forwardly tapered internal surface 35 leading forwardly from mounting portion 34 and a forward tapered portion 36 on the torpedo member is in inwardly spaced relation with surface 35. A plurality of radial arms 37 (FIG. 2) connect tapered portions 26 and 36 of the torpedo member with its mounting portion 34, leaving spaces 38 between these spokes for material passage. Spokes 37 are preferably rounded in cross-section to facilitate material flow.

An external electrical coil heater 39 surrounds body 18 and surface 29 of cap 27. For this purpose, support 21 has a recess 41 within which the rearward portion of heater 39 is disposed. The heater thus is in contact with practically the entire body which carries passage 22 and also the rearward portion of the cap in which passages 38 are disposed. Heat conduction may thus be accomplished in a directly radial path inwardly from the heater to the material passage along all portions thereof without having to rely on axial heat flow. Thus, cap 27 need not be fabricated of an especially highly heat conductive metal but a material may be used which is sufficiently hard to resist abrasion at orifice 42 which leads from conical wall 35 to mold cavity 13. Since torpedo member portion 26 extends into the central area of heater 39 where the temperature is highest, portion 26 will act as a heat dissipating element, and the substantial mass of the torpedo will enhance heat control, and contribute to an improved temperature profile.

It should also be observed that while housing 19 is in contact with intermittent surfaces 29, these are interrupted by flats 31 on the cap so that the material passage in this area will not excessively heat. To prevent such excess heat at the conical flow portion of the material passage is a desirable characteristic in nozzles of this type. It should also be observed that a space 43 is provided between the tapered wall 16 of the die and the external tapered surface 32 of cap 27. This air gap will prevent excessive cooling of the cap by those portions of the mold die which have cooling passages such as that indicated schematically at 44. Material freezing problems which have existed in certain prior art constructions will thus be avoided.

In operation, molten plastic material will flow through passages 22, 24 and 38 to the space between conical portion 36 and wall 33 to orifice 42 and thence to mold cavity 13. Heater 39 will heat these passages as described above in an efficient manner with controlled heating in the area of cap 27.

It may be desirable, in order to change to a different size of orifice 32, or if this orifice wears out, to change the cap 27. This may be easily done merely by unthreading the cap with the aid of flats 31 and replacing it with another, carrying torpedo member 25 therein. This is much less expensive than prior art constructions in which it was necessary to exchange the molds or a mold insert carrying the orifice.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An injection molding machine nozzle mountable in a mold die, comprising an elongated body having a central material passage therethrough, a cap removably mounted at the forward end of said body, the forward end of said cap being tapered forwardly, a heater surrounding and in heat exchange relation with said body and the rearward portion of said cap, a torpedo member fixedly mounted in said cap, said torpedo member being in heat exchange relation with said body and coactive therewith to maintain material in said central passage in a liquid, flowable condition, said torpedo member having tapered forward and rearward end portions and a radially outwardly extending mounting portion at the forward end thereof fitting snugly in and in heat exchange relation with and supported by said cap, said torpedo being disposed substantially entirely in and spaced radially inwardly from the wall of said material passage with the tapered forward end thereof extending downwardly into the forward end of said cap, whereby said material passage diverges around said torpedo and converges between said tapered forward torpedo portion and said cap, material passageway means in the mounting portion of said torpedo member, a bore in said mold die having a tapered forward end, and mounting means positioning said nozzle in said bore with said tapered forward cap portion in spaced relation with the tapered portion of said mold die bore.

2. The combination according to claim 1, said mounting means comprising a cylindrical housing surrounding said heater, means inhibiting transfer of heat from said cap to said housing, and a rearward support member for said body and housing.

3. The combination according to claim 2, wherein said cap is threadably mounted on said body, and said heat inhibiting means is in the form of an external surface on said cap having flats serving dual functions of providing wrench access and of spacing substantial portions of said housing from said cap.

4. The combination according to claim 1, wherein the mounting portion of said torpedo member is cylindrical in form and wherein the snug fit thereof with said cap assists in the transfer of heat from said body to melt material in said central passage.

5. The combination according to claims 1, 2, 3 or 4, wherein said torpedo member extends sufficiently into said central body passage so that the tapered rearward end thereof is opposite an intermediate portion of said heater.

6. An injection molding machine nozzle comprising body means adapted for mounting in a mold die, said body means having an elongate passage through which melt material from the machine is conducted to a discharge orifice at one end thereof, said body means also defining an annular space surrounding but separate from said passage;

inner and outer heater means in said passage and said annular space, respectively, said outer heater means being in heat exchange relation at the inner side thereof with said body means for maintaining the melt in said passage normally in a flowable condition in use, said inner heater means comprising a metallic mass spaced radially inwardly from the wall of said passage for substantially its entire length and having a tapered forward end disposed behind and in proximity to said discharge orifice;

means adjacent to the forward end of said inner heater means fixedly mounting the latter in said body and providing a direct radial heat flow path from said outer heater means to said inner heater means behind and adjacent to said orifice; and means for spacing and physically separating at least a portion of said body means adjacent to said orifice from a mold die in which said nozzle is mounted to inhibit heat loss particularly from the mentioned portion of said body means to said mold die and to permit heat from said inner heater means to concentrate at the tapered lower end thereof to prevent freeze-off of material in said orifice.

7. The invention as defined by claim 6 wherein the portion of said passage immediately behind said orifice and the portion of said inner heater means forwardly of said mounting means are tapered in the direction of said orifice and disposed in relatively closely spaced relation with respect to each other.

8. The invention according to claims 6 and 7 wherein said inner heater means extends rearwardly in said passage from said mounting means but terminates a substantial distance short of the rearward end of said outer heater means.

9. The invention according to claims 6 and 7 wherein said outer heater means is in the form of an electric heater coil and wherein the rearward end of said inner heater means terminates at substantially the middle of said heater coil.

10. The invention according to claims 6 and 7 wherein said outer heating means is in the form of an electric heating coil which extends substantially the full length of said passage, wherein said inner heating means provides a heat sink for the forward tip thereof, and wherein said inner heating means has a tapered rearward end disposed at substantially the middle of said heater coil.

11. The invention as defined by claim 7 wherein said body means includes a rearward body member and a forward cap detachably interconnected with each other, and wherein the tapered portion of said passage is formed in said cap.

12. The invention as defined by claim 11 wherein said cap is formed of a relatively hard and abrasive-resistant material and is threaded on the forward end of said body member so as to be readily removable for replacement or repair.

13. The invention as defined by claim 12 wherein said mounting means is disposed between and securely held by said body member and said cap.

14. The invention as defined by claim 13 wherein said mounting means fits snugly in and peripherally engages said cap for effective transfer of heat from said outer heater means to said inner heating means through said cap and said mounting means.

15. The invention as defined by claim 14 wherein said body means includes a housing member surrounding and spaced radially outwardly from said outer heater means and from at least a substantial portion of the peripheral surface of said cap.

16. The invention as defined by claim 15 wherein said body means includes support means detachably interconnected with rearward end portions of said housing and body members.

* * * * *